(12) United States Patent  
Shibuno

(10) Patent No.: US 8,032,019 B2  
(45) Date of Patent: Oct. 4, 2011

(54) CAMERA BODY AND IMAGING APPARATUS

(75) Inventor: Koji Shibuno, Osaka (JP)

(73) Assignee: Panasonic Corporation, Osaka (JP)

( * ) Notice: Subject to any disclaimer, the term of this patent is extended or adjusted under 35 U.S.C. 154(b) by 45 days.

(21) Appl. No.: 12/468,988

(22) Filed: May 20, 2009

(65) Prior Publication Data

US 2009/0290862 A1 Nov. 26, 2009

(30) Foreign Application Priority Data

May 21, 2008 (JP) .................................. 2008-132766

(51) Int. Cl.
*G03B 7/00* (2006.01)

(52) U.S. Cl. ........................................ 396/213; 348/362

(58) Field of Classification Search ................ 396/257, 396/246, 529, 213; 348/362
See application file for complete search history.

(56) References Cited

U.S. PATENT DOCUMENTS

| | | | | |
|---|---|---|---|---|
| 4,396,271 A | * | 8/1983 | Hiraike | 396/508 |
| 5,057,927 A | * | 10/1991 | Hieda | 348/363 |
| 5,416,517 A | * | 5/1995 | Tani et al. | 348/249 |
| 5,428,421 A | | 6/1995 | Kawahara et al. | |
| 5,604,560 A | * | 2/1997 | Kaneda | 396/133 |

FOREIGN PATENT DOCUMENTS

| | | |
|---|---|---|
| JP | 1-36303 B | 7/1989 |
| JP | 2-257126 A | 10/1990 |
| JP | 4-280236 A | 10/1992 |
| JP | 8-82826 A | 3/1996 |
| JP | 9-93484 A | 4/1997 |
| JP | 2000-287122 A | 10/2000 |
| JP | 2006-208897 A | 8/2006 |
| JP | 2006-215310 A | 8/2006 |
| JP | 2006-287586 A | 10/2006 |
| JP | 2007-322922 A | 12/2007 |

OTHER PUBLICATIONS

Translation of JP Publication No. 08-082826; Kawai, Toru; Camera; Publication Date: Mar. 26, 1996.*

* cited by examiner

*Primary Examiner* — W.B. Perkey
*Assistant Examiner* — Fang-Chi Chang
(74) *Attorney, Agent, or Firm* — Panasonic Patent Center; Dhiren Odedra; Kerry Culpepper

(57) ABSTRACT

A camera body is provided, to which an interchangeable lens is mountable, the interchangeable lens including a diaphragm and capable of sending driving speed information of the diaphragm. The camera body has a receiving unit operable to receive the driving speed information of the diaphragm from the interchangeable lens, an imaging unit operable to capture a subject image formed by the interchangeable lens to generate image data, a controller operable to set an imaging condition for the imaging unit, and a sending unit operable to send a control signal for changing brightness information of the interchangeable lens to the interchangeable lens. The controller sets the imaging condition for a period from a start to an end of a driving of the diaphragm according to the received driving speed information of the diaphragm when the sending unit sends the control signal to the interchangeable lens.

5 Claims, 8 Drawing Sheets

CAMERA BODY AND IMAGING APPARATUS

BACKGROUND

1. Technical Field

The technical field relates to a camera body that can be connected to an interchangeable lens, as well as to an imaging apparatus that includes an interchangeable lens and a camera body.

2. Related Art

JP-A-2006-215310 discloses an interchangeable lens system that includes a video camera (a camera body), an interchangeable lens for a single-lens reflex camera that can be connected to the camera body, and an intermediate adapter that connects the camera body and the interchangeable lens. Upon capturing subject images and sequentially generating image data, the camera body performs, using the intermediate adapter, AE (Auto Exposure) control on each of the sequentially generated image data by determining a driving amount and a driving speed of a diaphragm of the interchangeable lens. Specifically, the camera body sends a target video signal level and a detected video signal level to the intermediate adapter. The intermediate adapter determines a driving amount and a driving speed of the diaphragm of the interchangeable lens in accordance with a difference between the target video signal level and the detected video signal level, and sends, to the interchangeable lens, the driving amount and the driving speed thus determined respectively. The interchangeable lens controls the diaphragm at the driving amount and the driving speed thus received.

A conventional camera body is incapable of performing smooth AE control on each of image data generated by an imaging device for the following reasons. As exemplified in FIG. 8(a), it is assumed that a diaphragm value is set to "F8" at an interchangeable lens, that a sensitivity of a CMOS sensor is set to ISO "200" as well as an exposure time of the CMOS sensor is set to "1/30 second" for one frame at the camera body as imaging conditions for the CMOS sensor. In a case where a moving image is being captured under these conditions and the camera body sends, to the interchangeable lens, a control signal for regulating to "F4" information on a brightness of the interchangeable lens (such as the diaphragm value), the camera body performs, immediately after the control signal is sent, AE control under the imaging conditions (an ISO sensitivity "100" and an exposure time "1/60 second") corresponding to the diaphragm value "F4" of the interchangeable lens. On the contrary, it takes some time for the diaphragm of the interchangeable lens to change from a state corresponding to the diaphragm value "F8" to a state corresponding to the diaphragm value "F4", resulting in that there are several frames of images formed during the change in diaphragm value from "F8" to "F4". Then, as shown in FIG. 8(b), during the change of the diaphragm, the camera body operates under the imaging conditions corresponding to the diaphragm value "F4" although the diaphragm of the interchangeable lens has not yet corresponded to the diaphragm value "F4". Therefore, the camera body is incapable of performing the most appropriate AE control, and the CMOS sensor of the camera body outputs a moving image with unstable exposure. Such a moving image thus outputted may have an unstable brightness.

As described above, when there is a change in information on the brightness of the interchangeable lens (such as the diaphragm value), the conventional camera body has been incapable of performing appropriate AE control until completion of the change at the interchangeable lens correspondingly to the information on the brightness of the interchangeable lens. In other words, smooth AE control is not performed on each of the sequentially generated image data.

SUMMARY

In view of the above problems, an object is to provide a camera body that is capable of performing smooth AE control on each of sequentially generated image data upon change of information on a brightness of an interchangeable lens (such as a diaphragm value), and an imaging apparatus including the camera body.

A camera body according to one aspect is a camera body to which an interchangeable lens is mountable. The interchangeable lens includes a diaphragm and is capable of sending driving speed information of the diaphragm. The camera body includes: a receiving unit operable to receive the driving speed information of the diaphragm from the interchangeable lens; an imaging unit operable to capture a subject image formed by the interchangeable lens to generate image data; a controller operable to set an imaging condition for the imaging unit; and a sending unit operable to send a control signal to the interchangeable lens for changing brightness information of the interchangeable lens. The controller sets the imaging condition for a period from a start to an end of a driving of the diaphragm according to the received driving speed information of the diaphragm when the sending unit sends the control signal to the interchangeable lens.

According to the above configurations, the camera body preliminarily obtains from the interchangeable lens information on a driving speed of the diaphragm (driving speed information), and sets imaging conditions for the camera body (a sensitivity and/or an exposure time) according to the obtained driving speed information upon change of information on a brightness of the interchangeable lens (such as a diaphragm value). In other words, the imaging conditions for the camera body until completion of operation of the interchangeable lens corresponding to the information on the changed brightness are set according to the obtained driving speed information. For example, the camera body determines a length of period from the start to the end of the change of the diaphragm in the interchangeable lens (alternatively, the number of image data, or the like) according to the driving speed of the diaphragm so as to calculate (interpolate) a diaphragm value for a frame formed during the change, and to set imaging conditions according to the interpolated diaphragm value. Such a configuration allows the imaging conditions to be set more suitably for the diaphragm value being changed. Thus, appropriate AF control until completion of the change at the interchangeable lens is realized.

An imaging apparatus according to another aspect includes an interchangeable lens and a camera body to which the interchangeable lens is mountable. The interchangeable lens includes: a diaphragm operable to regulate an amount of light of a subject image collected by an optical system; a driver unit operable to drive the diaphragm at a predetermined driving speed; a storage unit operable to store driving speed information of the diaphragm; and a sending unit operable to send the stored driving speed information of the diaphragm to the camera body. The camera body includes: a receiving unit operable to receive the driving speed information of the diaphragm from the interchangeable lens; an imaging unit operable to capture the subject image formed by the interchangeable lens to generate image data; a controller operable to set an imaging condition for the imaging unit; and a sending unit operable to send a control signal to the interchangeable lens for changing brightness information of the interchangeable lens. The controller set the imaging condition for a period from a start to an end of a driving of the diaphragm according to the received driving speed information of the diaphragm when the sending unit sends the control signal to the interchangeable lens.

According to the above configurations, the camera body can perform smooth AE control on each of sequentially generated image data when information on a brightness of the interchangeable lens (for example, the diaphragm value) is changed.

DETAILED DESCRIPTION OF THE PREFERRED EMBODIMENTS

Described below with reference to the accompanying drawings is an imaging apparatus according to an embodiment. The imaging apparatus of the present embodiment is embodied as a digital single-lens camera (hereinafter, simply referred to as a "digital camera"). The digital camera outputs image data of which one frame has a brightness determined by a diaphragm of an interchangeable lens as well as a sensitivity and an exposure time of an imaging unit respectively set at a camera body. Image data generated by a conventional camera has an unstable brightness during change of a diaphragm value thereof because the diaphragm value is uncertain from the start to the end of the change of the diaphragm. On the contrary, in the present embodiment, a diaphragm value during change of a diaphragm is calculated to regulate imaging conditions in accordance with the calculated diaphragm value. Accordingly, the camera body can prevent a brightness of a moving image generated by the CMOS sensor from being unstable. Specifically, in the digital camera according to the present embodiment, the camera body obtains from the interchangeable lens information on a driving speed of the diaphragm (driving speed information) upon attaching the lens thereto. In a case where information on a brightness of the interchangeable lens (a diaphragm value in the present embodiment) is changed during imaging, the camera body calculates a diaphragm value during the start to the end of change of the diaphragm of the interchangeable lens based on the obtained driving speed information, and sets imaging conditions (a sensitivity and an exposure time of a CMOS sensor in the present embodiment) in accordance with the calculated diaphragm value.

1. Configurations 1-1. Entire Configuration

Figure 1:
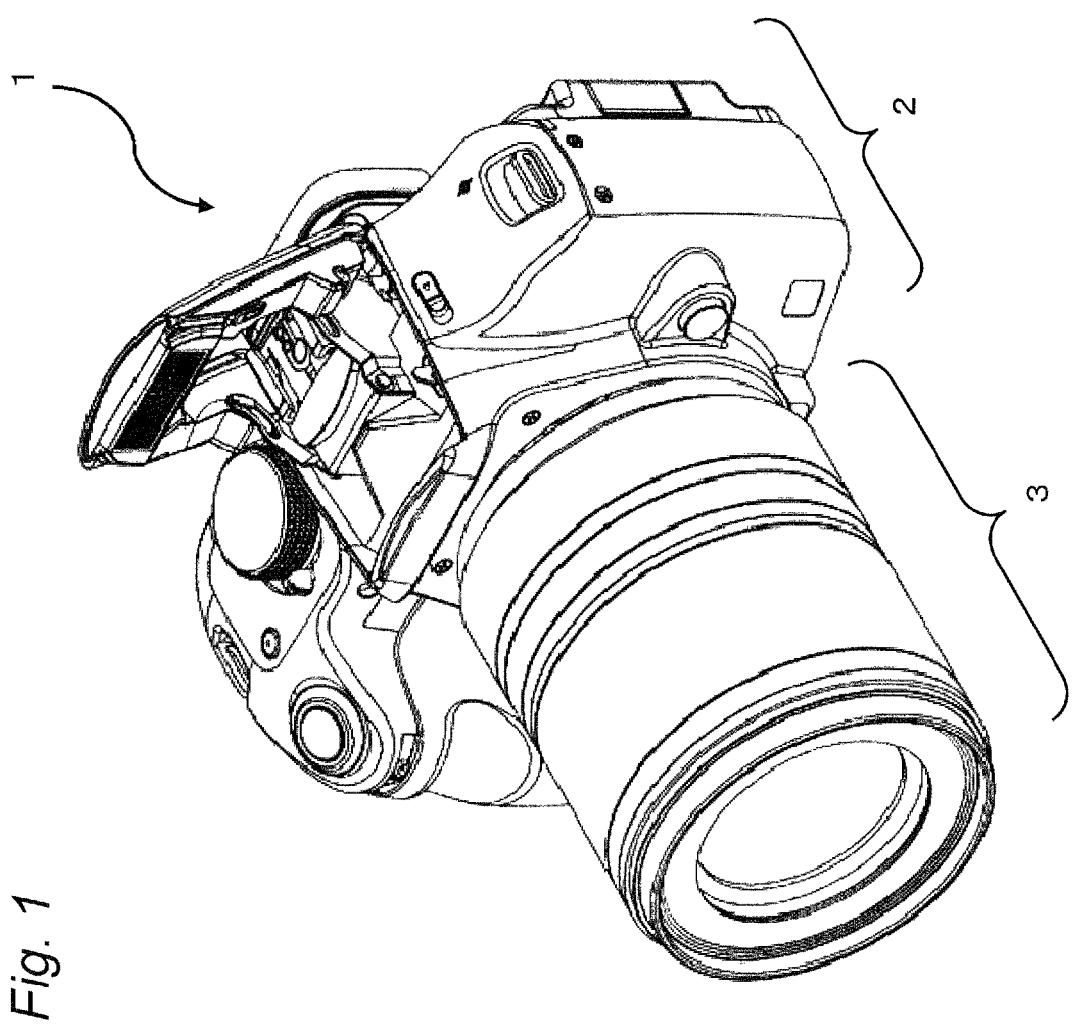
FIG. 1 is a perspective view of a digital camera according to an embodiment.

FIG. 1 is a perspective view of the digital camera according to the embodiment. In the present embodiment, a digital camera 1 includes a camera body 2 and an interchangeable lens 3 detachable from the camera body 2. The camera body 2 captures an image of a subject on which light is collected by an optical system of the interchangeable lens 3, and stores the captured subject image as image data. It should be noted that the camera body 2 and the interchangeable lens 3 are not necessarily required to be detachable from each other but are required only to be connectable with each other.

1-2. Configuration of Camera Body

Figure 2:
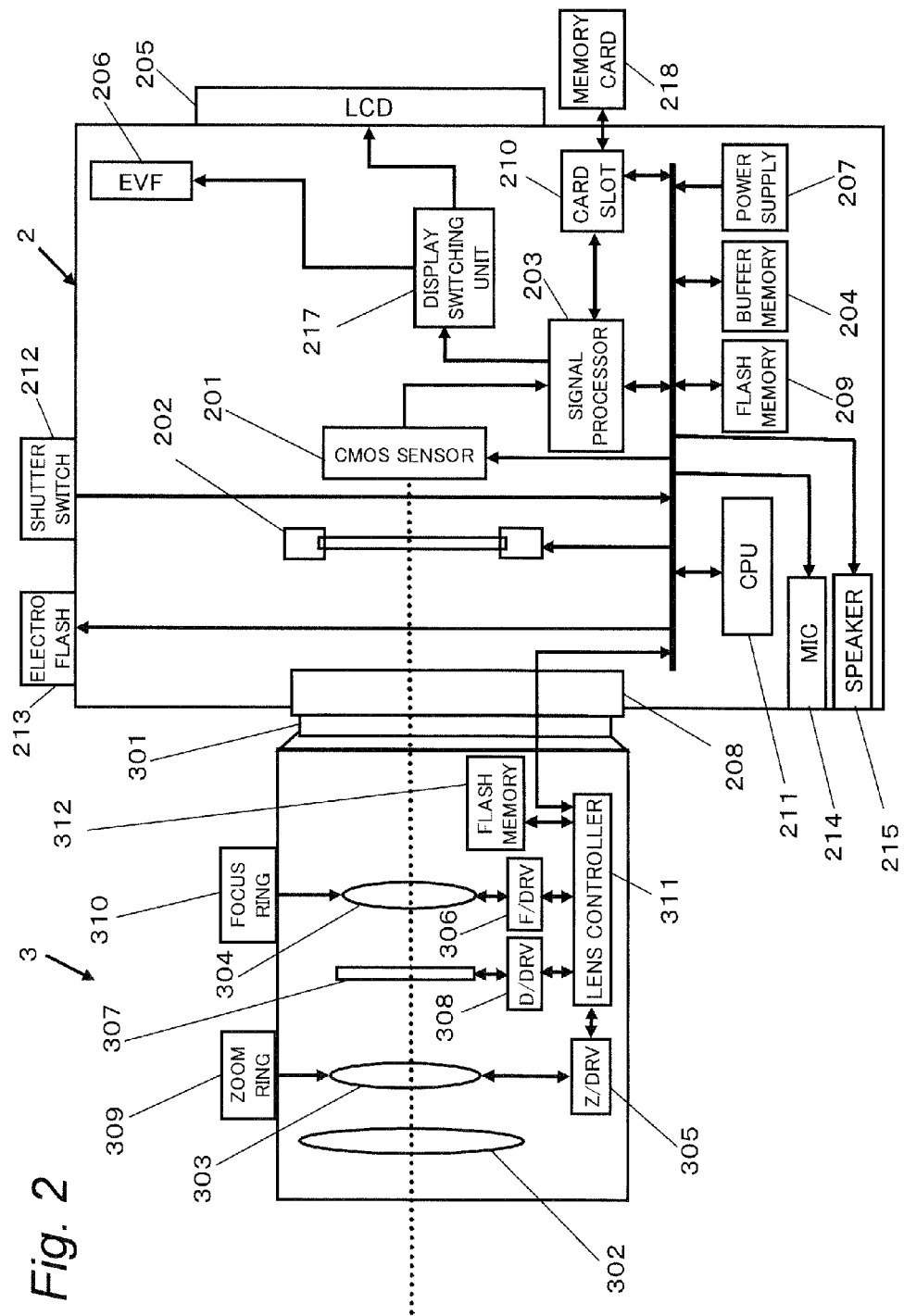
FIG. 2 is a block diagram showing a configuration of the digital camera according to the embodiment.

FIG. 2 is a block diagram showing a specific configuration of the digital camera 1 of FIG. 1. The camera body 2 includes a CMOS sensor 201, a mechanical shutter 202, a signal processing processor (DSP) 203, a buffer memory 204, a liquid crystal monitor 205, an electronic viewfinder (EVF) 206, a power supply 207, a body mount 208, a flash memory 209, a card slot 210, a CPU 211, a shutter switch 212, an electronic flash 213, a microphone 214, and a speaker 215.

The CMOS sensor 201 functions as an imaging unit that captures a subject image and generates image data (digital or electrical signals). The CMOS sensor 201 has a light-receiving element, an AGC (gain control amplifier), and an AD converter. The light-receiving element converts an optical signal, which is collected light using the optical system of the interchangeable lens 3, into an electrical signal. The AGC amplifies the electrical signal that is outputted from the light-receiving element. The AD converter converts the electrical signal, which is outputted from the AGC, into a digital signal.

The CMOS sensor 201 performs various operations such as exposure, transfer, and actuating an electronic shutter based on a control signal transmitted from the CPU 211. These various operations can be performed using a built-in timing generator or the like. The electronic shutter regulates an exposure time (imaging time) for one frame by the light-receiving element.

The mechanical shutter 202 switches between cutting off and letting pass, an optical signal that is incident on the CMOS sensor 201 by way of the optical system of the interchangeable lens 3. The mechanical shutter 202 is opened or closed to temporally regulate the amount of light incident on the CMOS sensor 201. The mechanical shutter 202 is driven by a mechanical shutter driver (not shown), which has mechanism components such as a motor and a spring and is configured to drive the mechanical shutter 202 in accordance with control by the CPU 211.

The signal processing processor (DSP) 203 performs predetermined image treatments onto the image data that is converted into digital signals by the AD converter. The predetermined image treatments include gamma conversion, YC conversion, an electronic zoom process, a compression process, an extension process, and the like.

The buffer memory 204 functions as a work memory upon processing of the signal processing processor 203 and control processing of the CPU 211, and can be embodied as a DRAM.

The liquid crystal monitor 205 is disposed on a rear surface of the camera body 2 to display image data generated by the CMOS sensor 201 or further predeterminedly processed image data. A DA converter converts an image signal, which is inputted into the liquid crystal monitor 205, from a digital signal into an analog signal when the image signal is outputted from the signal processing processor 203 to the liquid crystal monitor 205.

The electronic viewfinder 206 is disposed on the camera body 2 to display image data generated by the CMOS sensor 201 or further predeterminedly processed image data. The DA converter similarly converts an image signal, which is inputted into the electronic viewfinder 206, from a digital signal into an analog signal when the image signal is outputted from the signal processing processor 203 to the electronic viewfinder 206.

There is provided a display switching unit 217 that switches display of the image signals on the liquid crystal monitor 205 and on the electronic viewfinder 206. Specifically, when the liquid crystal monitor 205 displays an image thereon, nothing is displayed on the electronic viewfinder 206. On the other hand, when the electronic viewfinder 206 displays an image thereon, nothing is displayed on the liquid crystal monitor 205. This display switching unit 217 can be embodied as a switcher having a physical structure, or the like. When the switcher is switched with the signal processing processor 203 and the liquid crystal monitor 205 being electrically connected to each other, this electrical connection between the signal processing processor 203 and the liquid crystal monitor 205 is cut off and the signal processing processor 203 and the electronic viewfinder 206 are electrically connected to each other. The display switching unit 217 is not limited to such a switcher but may be a device that switches display on the liquid crystal monitor 205 and display on the electronic viewfinder 206 in accordance with a control signal from the CPU 211. Further, in the present embodiment, display on the liquid crystal monitor 205 and display on the electronic viewfinder 206 are switched. Alternatively, display on the liquid crystal monitor 205 and display on the electronic viewfinder 206 may be simultaneously performed. Upon such simultaneous display, the liquid crystal monitor 205 and the electronic viewfinder 206 may display an identical image or images different from each other.

The power supply 207 supplies power to be consumed by the digital camera 1. The power supply 207 may be embodied as a dry battery, a rechargeable battery, or the like. Further alternatively, the power supply 207 may be configured to supply external power to the digital camera 1 by way of a power code.

The body mount 208 is a member that allows the interchangeable lens 3 to be attached and detached in cooperation with a lens mount 301 of the interchangeable lens 3. For example, the body mount 208 can be electrically connected to the interchangeable lens 3 via a connecting terminal as well as be mechanically connected to the interchangeable lens 3 via a mechanical member such as a locking member. The body mount 208 outputs a signal received from a lens controller 311 in the interchangeable lens 3 to the CPU 211, and also outputs a signal received from the CPU 211 to the lens controller 311 in the interchangeable lens 3.

The flash memory 209 is a memory medium to be used as an embedded memory. The flash memory 209 stores image data, further image data to which predetermined processes are applied, and a digitalized audio signal. The flash memory 209 also stores a program or a set value to be used for controlling of the CPU 211. Moreover, the flash memory 209 stores information (driving speed information, which is to be described in detail later) on a driving speed (such as a maximum speed) of the diaphragm received from the interchangeable lens 3. Also a diaphragm value set by a user which operates an operation member (not shown) provided on the camera body 2 and used for regulating a diaphragm value is stored in the flash memory 209.

The card slot 210 allows a memory card 218 to be attached thereinto and detached therefrom. The memory card 218 is a memory medium that stores image data, further predeterminedly processed image data, and a digitalized audio signal.

The CPU 211 controls the entire camera body 2. The CPU 211 also sends and receives a control signal to and from the lens controller 311 in the interchangeable lens 3, information on the optical system, and the like. The CPU 211 may be embodied as a microcomputer or a hard-wired circuit.

The shutter switch 212 is a button provided on an upper surface of the camera body 2, and functions as an operation unit that detects half-press operations and full-press operations by a user. Upon detecting a half-press operation by a user, the shutter switch 212 outputs a half-press signal to the CPU 211. On the other hand, upon detecting a full-press operation by a user, the shutter switch 212 outputs a full-press signal to the CPU 211. In the present embodiment, full-press signals include an imaging start signal that starts capturing a moving image or a still image. The CPU 211 performs various control operations in accordance with these signals.

The electronic flash 213 irradiates a subject with light in accordance with a control signal from the CPU 211. The electronic flash 213 can be embodied as a xenon lamp, a capacitor, and the like. The electronic flash 213 thus configured accumulates high-voltage charges in the capacitor and applies the accumulated charges to an electrode of the xenon lamp to emit light.

The microphone 214 converts a sound into electrical signals. The electrical signal outputted from the microphone 214 is converted into a digital signal by the AD converter. The digital signal obtained by the AD converter is stored in the flash memory 209 or the memory card 218 in accordance with control by the CPU 211.

The speaker 215 converts electrical signals into a sound. The electrical signal to be inputted into the speaker 215 is converted from a digital signal by the DA converter. The DA converter receives a digital signal read from the flash memory 209 or the memory card 218 in accordance with control by the CPU 211.

1-3. Configuration of Interchangeable Lens

The interchangeable lens 3 includes the lens mount 301, an objective lens 302, a zoom lens 303, a focus lens 304, a zoom driver 305 that drives the zoom lens 303, a focus driver 306 that drives the focus lens 304, a diaphragm 307, a diaphragm driver 308 that drives the diaphragm 307, a zoom ring 309, a focus ring 310, the lens controller 311, and a flash memory 312. The zoom driver 305, the focus driver 306, and the diaphragm driver 308 configure a driver unit that changes optical conditions.

The optical system of the interchangeable lens 3 has the objective lens 302, the zoom lens 303, and the focus lens 304, and collects light from a subject. The zoom driver 305 drives the zoom lens 303 in accordance with control by the lens controller 311. The focus driver 306 drives the focus lens 304 in accordance with control by the lens controller 311. The zoom ring 309 is externally attached to the interchangeable lens 3 and drives the zoom lens 303 in accordance with an operation by a user. The focus ring 310 is externally attached to the interchangeable lens 3 and drives the focus lens 304 in accordance with an operation by a user. The zoom lens 303 is driven by the zoom driver 305 or the zoom ring 309 and regulates a zoom magnification. The focus lens 304 is driven by the focus driver 306 or the focus ring 310 and regulates a focus. Each of the focus lens 304 and the zoom lens 303 is a movable lens.

The diaphragm 307 regulates an amount of light passing through the optical system. The amount of light is regulated by increasing or decreasing the size of an aperture that is formed by five blades or the like. The diaphragm driver 308 changes the size of the aperture of the diaphragm 307. The size of the aperture can be set using a diaphragm value (an F number). In the present embodiment, the diaphragm driver 308 drives the diaphragm 307 in accordance with control by the lens controller 311. Specifically, the diaphragm driver 308 receives, from the lens controller 311, diaphragm driving speed information stored in the flash memory 312 as well as receives, from the camera body 2, a control signal (a diaphragm value and/or a driving amount) for regulating the diaphragm so as to regulate the diaphragm 307 in accordance with the diaphragm driving speed information and the control signal thus received. The diaphragm driving speed information indicates speed information relating to the changing speed of an amount of light which passes through the optical system and changes by driving the diaphragm 307. No particular limitation is applied to a method for changing the speed of driving the diaphragm 307. The speed of driving the diaphragm 307 may be changed by changing the current flowing into a motor that drives the diaphragm 307. The diaphragm driver 308 is configured to drive the diaphragm 307 in accordance with control by the lens controller 311 in the present embodiment. Alternatively, the diaphragm driver 308 may be configured to drive the diaphragm 307 in a mechanical method. In such a case, the body mount 208 is provided with an interlocking pin such that the diaphragm driver 308 receives a drive force of the interlocking pin so as to drive the diaphragm 307. The interlocking pin is driven by a motor or the like that is controlled by the CPU 211.

The lens controller 311 controls the entire interchangeable lens 3. The lens controller 311 may be embodied as a microcomputer or a hard-wired circuit. When the interchangeable lens 3 is attached to the camera body 2, the lens controller 311 reads information on a driving speed of the diaphragm 307 (driving speed information) that is stored in the flash memory 312 to send to the CPU 211 of the camera body 2. In the present embodiment, the interchangeable lens 3 sends information on a driving speed of the diaphragm 307 to the camera body 2 when the interchangeable lens 3 is attached to the camera body 2. However, such a timing of sending the information is not limited to that of the present embodiment. Alternatively, the interchangeable lens 3 may be configured to send diaphragm driving speed information to the camera body 2 when the camera body 2 requests the interchangeable lens 3 to send the diaphragm driving speed information. The lens controller 311 controls the diaphragm 307 via the diaphragm driver 308 in accordance with a diaphragm regulating control signal received from the camera body 2. The lens controller 311 sends, to the diaphragm driver 308, the diaphragm driving speed information that is read from the flash memory 312 as well as the diaphragm regulating control signal that is received from the camera body 2. Accordingly, the diaphragm driver 308 is capable of driving the diaphragm 307 in accordance with the driving speed of the diaphragm 307.

The flash memory 312 is a memory medium that is capable of storing information on a driving speed of the diaphragm 307. In a case where the interchangeable lens 3 is configured to control the diaphragm 307 at a constant driving speed, the diaphragm driving speed information indicates this constant driving speed. On the other hand, in a case where the interchangeable lens 3 is configured to control the diaphragm 307 at a variable driving speed, the diaphragm driving speed information indicates one of set values that can be set as the driving speeds (such as a maximum speed). The diaphragm driving speed information preferably indicates a predetermined driving speed for the diaphragm 307 in a case where the camera body 2 does not specify to the interchangeable lens 3 any diaphragm driving speed but the interchangeable lens 3 receives a diaphragm regulating control signal from the camera body 2. The lens controller 311 sends diaphragm driving speed information that is stored in the flash memory 312 to the camera body 2. Accordingly, during an arbitrary operation, the camera body 2 is capable of specifying diaphragm driving speed to the interchangeable lens 3 so as to control the diaphragm 307. In the present embodiment, the camera body 2 is capable of calculating a diaphragm value during change of the diaphragm of the interchangeable lens 3 based on the diaphragm driving speed information.

Figure 3:
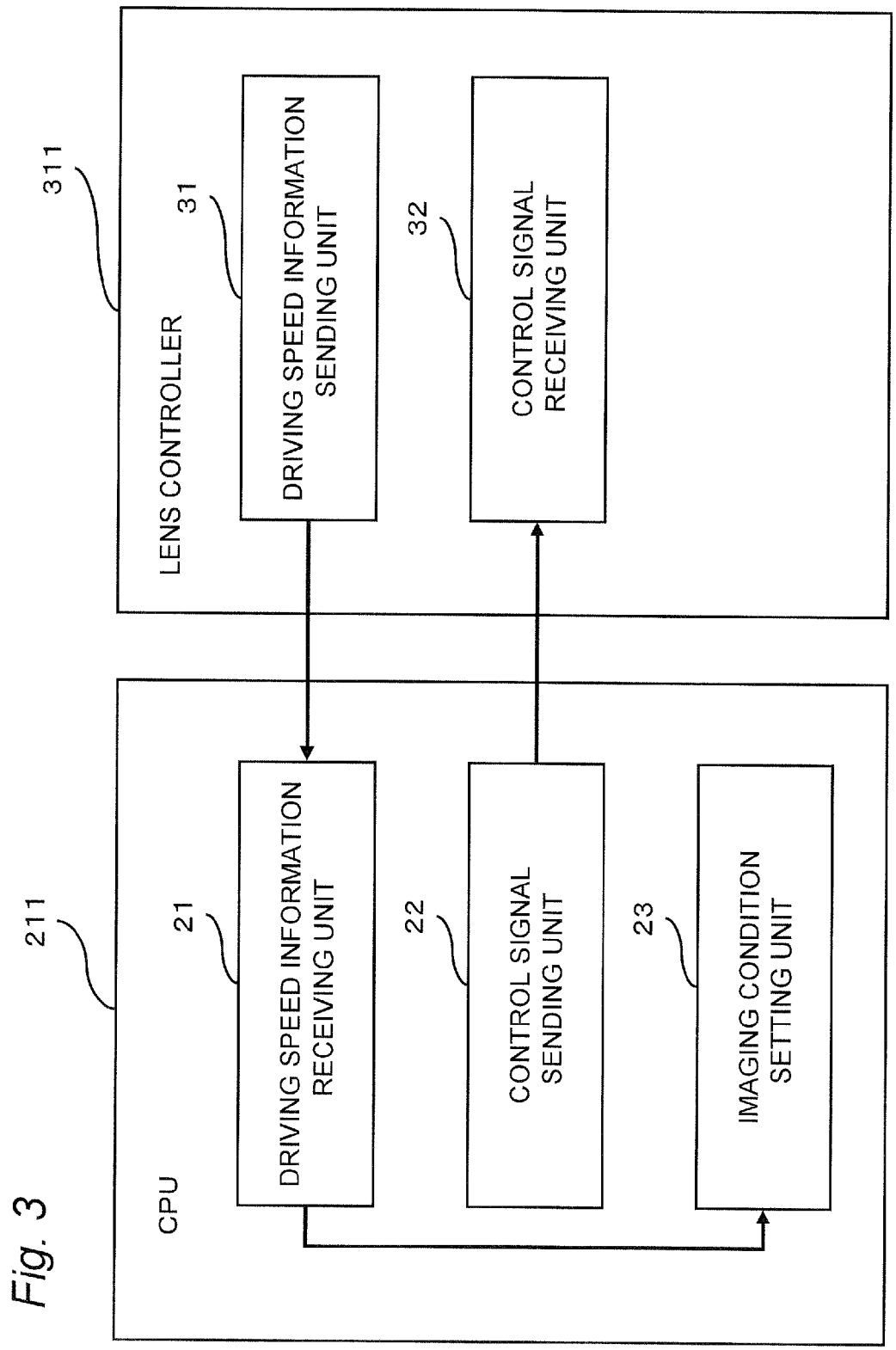
FIG. 3 is a functional diagram showing specific configurations of a CPU in a camera body and a lens controller in an interchangeable lens in the digital camera according to the embodiment.

1-4. Specific Configurations of CPU in Camera Body and Lens Controller in Interchangeable Lens FIG. 3 is a functional diagram showing specific configurations of the CPU 211 in the camera body 2 and the lens controller 311 in the interchangeable lens 3. The lens controller 311 in the interchangeable lens 3 has a driving speed information sending unit 31 and a control signal receiving unit 32. The driving speed information sending unit 31 sends information on a driving speed of the diaphragm 307 to the CPU 211 in the camera body 2. The control signal receiving unit 32 receives a control signal for regulating the diaphragm 307 from the camera body 2 and sends the received control signal to the diaphragm driver 308.

The CPU 211 in the camera body 2 has a driving speed information receiving unit 21, a control signal sending unit 22, and an imaging condition setting unit 23. The driving speed information receiving unit 21 receives information on a driving speed of the diaphragm 307 from the interchangeable lens 3. The control signal sending unit 22 sends a control signal for regulating the diaphragm 307. The imaging condition setting unit 23 sets imaging conditions for the CMOS sensor 201.

When the interchangeable lens 3 is attached to the camera body 2, the driving speed information receiving unit 21 receives information on a driving speed of the diaphragm 307 from the interchangeable lens 3 so as to store the received information on a driving speed of the diaphragm 307 in the flash memory 209.

The control signal sending unit 22 sends to the interchangeable lens 3, as a diaphragm regulating control signal, a diaphragm value that is set in the camera body 2 by a manual operation of a user or a function of the camera body 2 itself. The control signal sending unit 22 may send, to the interchangeable lens 3, a diaphragm value that a user inputs to the camera body 2 using an operation member (not shown). The CPU 211 detects a brightness of a subject in image data generated by the CMOS sensor 201, and calculates a diaphragm value based on the detected result. The control signal sending unit 22 sends the calculated diaphragm value to the interchangeable lens 3. It is thus possible to regulate an exposure in accordance with a brightness of a subject by detecting the brightness of the subject in image data and controlling the diaphragm 307 in accordance with the detected result.

The imaging condition setting unit 23 sets imaging conditions for the CMOS sensor 201 in accordance with information on a driving speed of the diaphragm 307 that is stored in the flash memory 209 along with change of the diaphragm value of the diaphragm 307 by a manual operation of a user or the function of the camera body 2 itself. The "imaging conditions" include a sensitivity to be possibly obtained by controlling the AGC, and an exposure time (a period from receiving light to reading) for the light-receiving element to be possibly obtained by controlling the timing generator. The imaging conditions to be set are required to include at least one of the sensitivity and the exposure time. Specifically, the imaging conditions may include only the sensitivity to be possibly obtained by controlling the AGC, or only the exposure time for the light-receiving element to be possibly obtained by controlling the timing generator.

2. Operations

Figure 4:
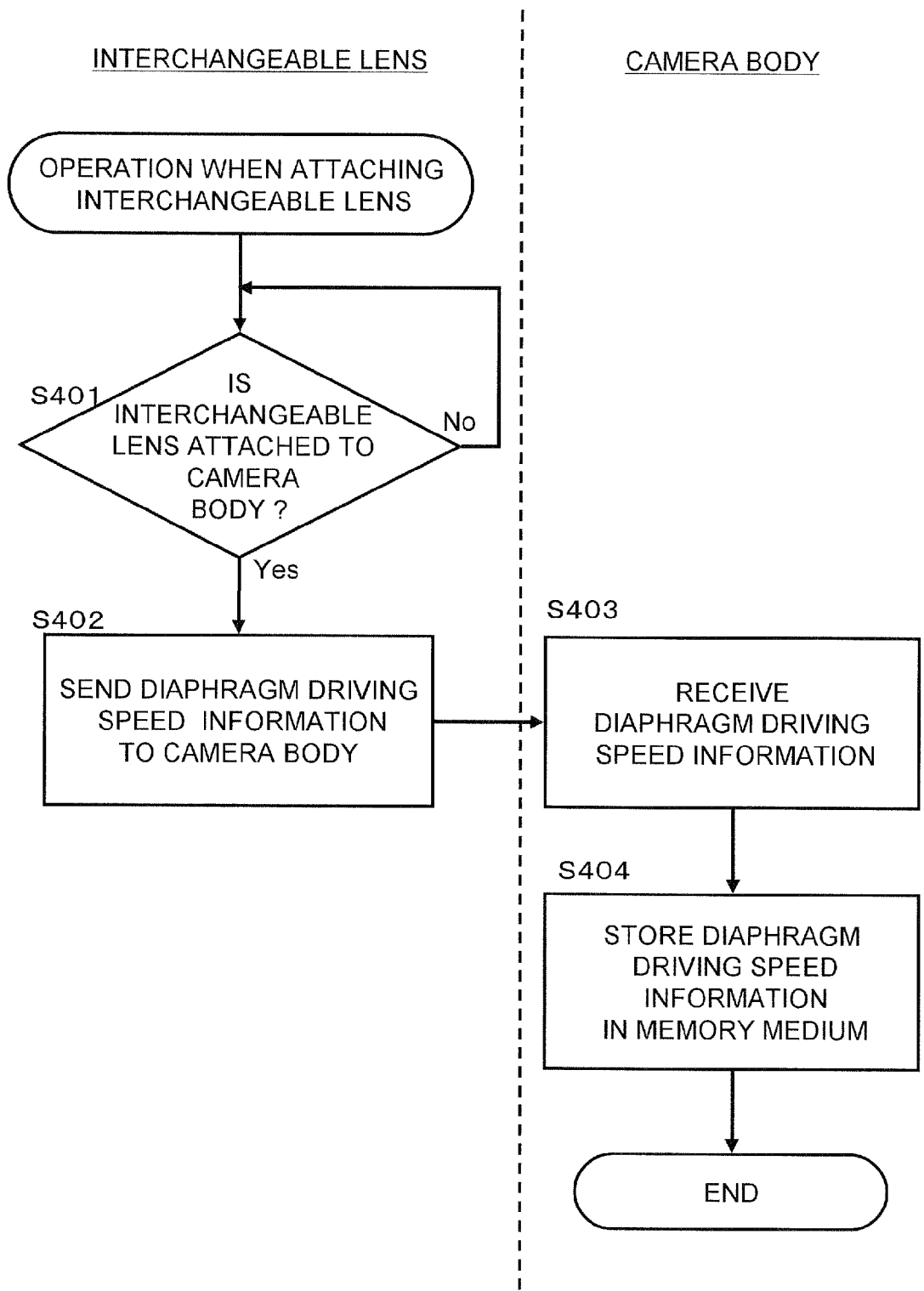
FIG. 4 is a flowchart showing operations, upon attaching a lens, of the digital camera according to the embodiment.
Figure 5:
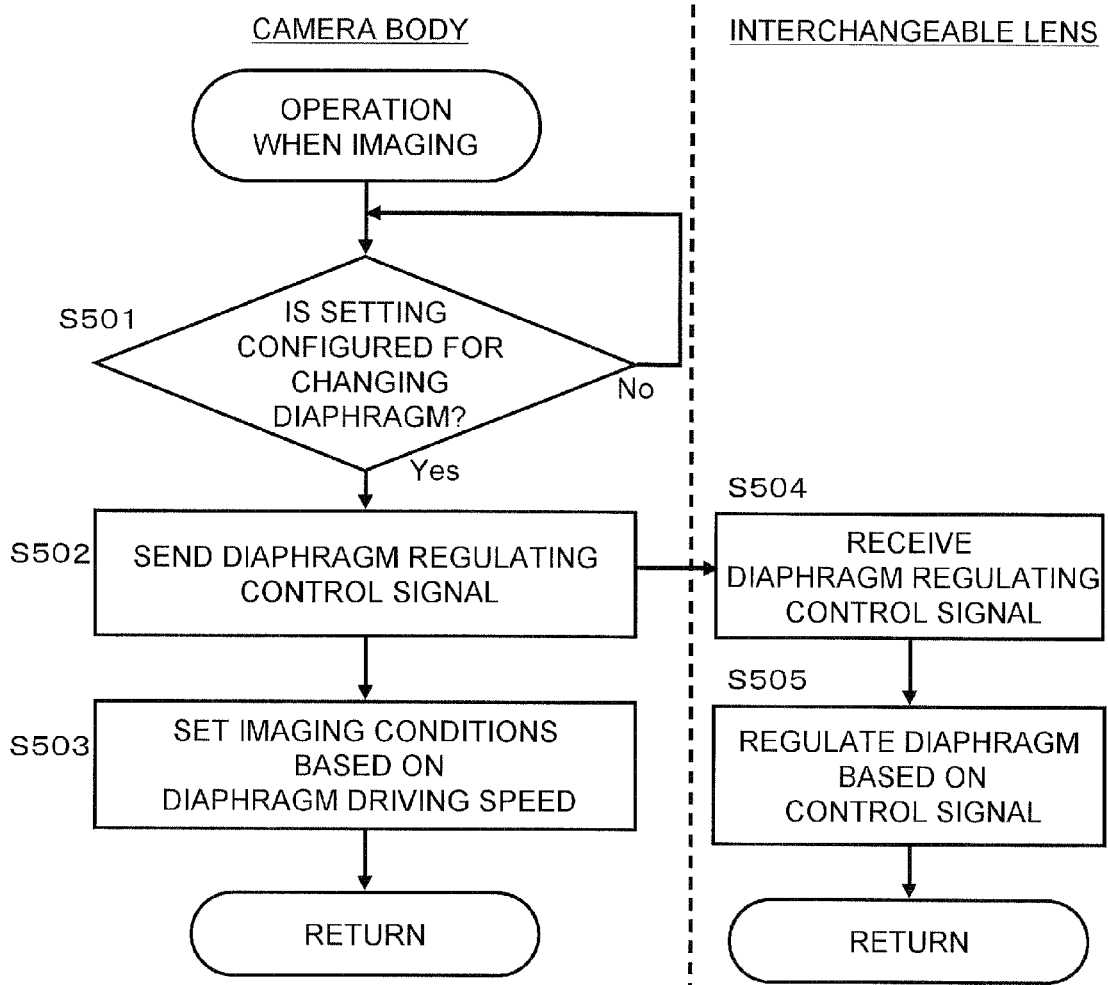
FIG. 5 is a flowchart showing operations, upon imaging, of the digital camera according to the embodiment.
Figure 6:
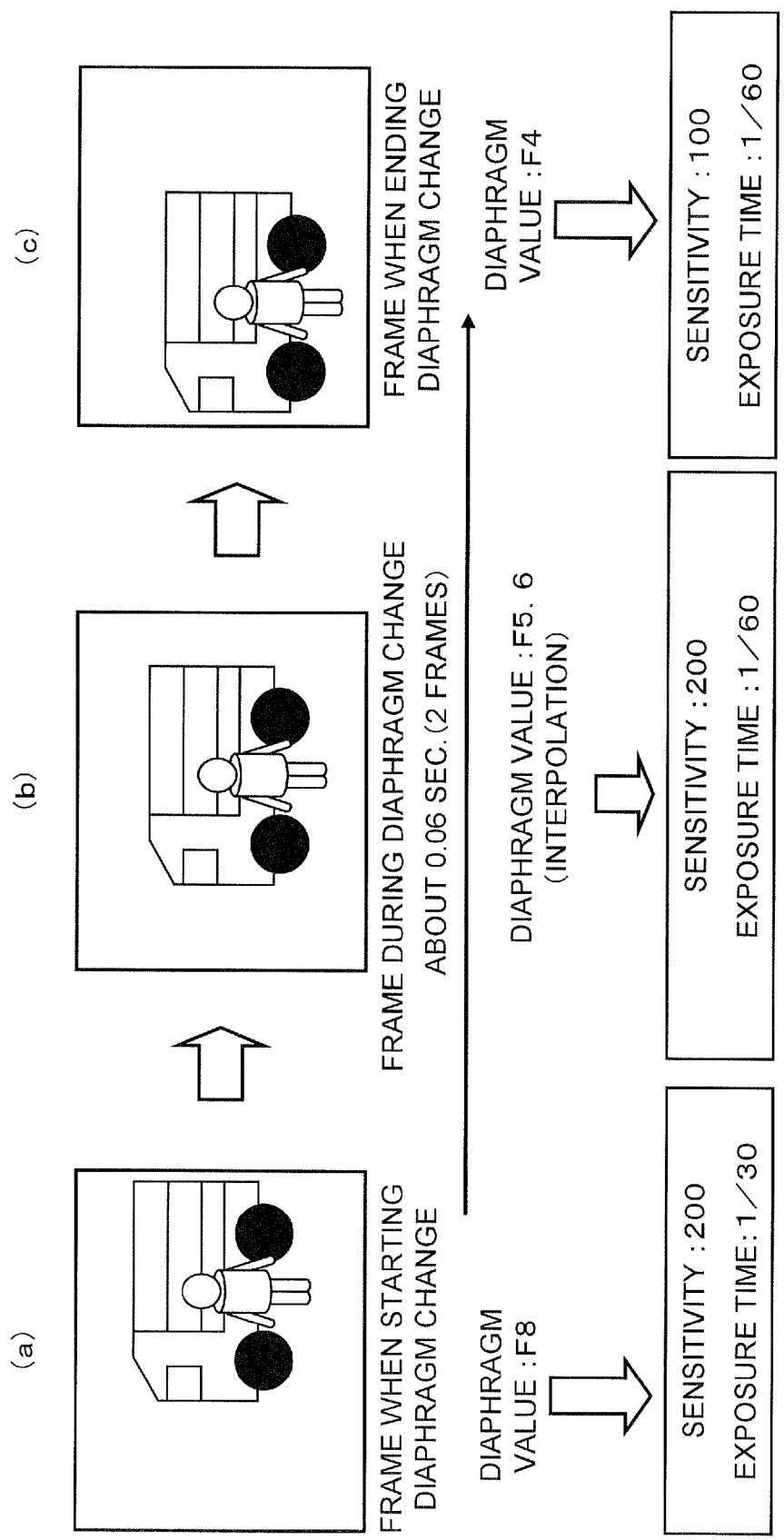
FIG. 6 is a view showing changes in set imaging conditions in a case where a diaphragm value is changed in the camera according to the embodiment.

Described below with reference to FIGS. 4 to 6 are operations of the digital camera 1 that is configured as described above. FIG. 4 is a flowchart showing operations of the lens controller 311 in the interchangeable lens 3 and the CPU 211 in the camera body 2 when the interchangeable lens 3 is attached to the camera body 2 (at an initial stage). Described are operations to be started from a state where the camera body 2 is powered on and the interchangeable lens 3 has not yet been attached to the camera body 2.

The lens controller 311 in the interchangeable lens 3 determines whether or not the interchangeable lens 3 is attached to the camera body 2 (S401). Upon the interchangeable lens 3 being attached to the camera body 2, the lens controller 311 sends diaphragm driving speed information that is stored in the flash memory 312 to the camera body 2 (S402).

The CPU 211 in the camera body 2 receives the diaphragm driving speed information from the interchangeable lens 3 (S403). The CPU 211 stores in the flash memory 209 the received diaphragm driving speed information (S404).

As described above, the digital camera 1 is made ready for imaging after the interchangeable lens 3 is attached to the camera body 2 and sends diaphragm driving speed information to the camera body 2.

With reference to FIGS. 5 and 6, there are described imaging operations of the digital camera 1. FIG. 5 is a flowchart showing operations of the lens controller 311 in the interchangeable lens 3 as well as the CPU 211 in the camera body 2 upon imaging after the interchangeable lens 3 is attached to the camera body 2. FIG. 6 is a schematic view showing imaging conditions to be set upon change of a diaphragm value.

Referring to FIG. 5, the CPU 211 in the camera body 2 determines whether or not the camera body 2 is set to change the diaphragm 307 (S501). In a case of being set to change the diaphragm, the camera body 2 sends, to the interchangeable lens 3, a diaphragm regulating control signal in accordance with such setting (S502). For example, when the currently set diaphragm value "F8" is replaced with a new diaphragm value "F4", the camera body 2 sends a control signal for specifying the new diaphragm value "F4" to the interchangeable lens 3.

The lens controller 311 in the interchangeable lens 3 receives the diaphragm regulating control signal from the camera body 2 (S504). The lens controller 311 sends, to the diaphragm driver 308, the received diaphragm regulating control signal as well as diaphragm driving speed information stored in the flash memory 312 so as to regulate the diaphragm 307 (S505). In one example of FIG. 6, the lens controller 311 receives a control signal for specifying the diaphragm value "F4" and regulates the diaphragm 307 in accordance with this control signal.

After sending the diaphragm regulating control signal to the interchangeable lens 3, the CPU 211 in the camera body 2 sets imaging conditions for the CMOS sensor 201 in accordance with diaphragm driving speed information stored in the flash memory 209 (S503). In such a case, a CPU in a conventional camera body sets imaging conditions in accordance with the new diaphragm value immediately after sending to a interchangeable lens a diaphragm regulating control signal. However, in the present embodiment, the CPU 211 firstly sets imaging conditions in accordance with a diaphragm value during change of the diaphragm, prior to setting imaging conditions in accordance with the new diaphragm value. Specifically, the CPU 211 firstly calculates, based on the diaphragm driving speed information that has been obtained in an initial stage, a length of period (alternatively, the number of image data, or the like) from the start to the end of change of the diaphragm 307. In accordance with the calculated result, the CPU 211 calculates (interpolates) a diaphragm value for a frame formed during the change of the diaphragm, and sets imaging conditions (a sensitivity and/or an exposure time) in accordance with the interpolated diaphragm value. Thereafter, the imaging conditions for the camera body 2 are changed so as to correspond to the new diaphragm value at a timing of completion of the change of the diaphragm in the interchangeable lens 3. For example, upon receiving from the interchangeable lens 3 information on completion of change of the diaphragm 307, the CPU 211 changes the imaging conditions for the camera body 2 so as to correspond to the new diaphragm value.

More specifically, in a case where the diaphragm 307 set to have a diaphragm value "F8 (=6 AV)" is changed to have a value "F4 (=4 AV)" as exemplified in FIG. 6, the CPU 211 performs the following first to fifth processes. In FIG. 6, the conditions prior to the change are assumed as indicated below.

[Conditions Prior to Change]
diaphragm value: F8 (=6 AV)
sensitivity: 200
exposure time: 1/30 (=5 TV)
diaphragm speed: 30 AV/sec
frame rate: 30 fps First Process: Calculate a Diaphragm Transition Amount.
  6 AV−4 AV=2 AV
Second Process:
  Calculate the number of frames included in the period of diaphragm transition from F8 to F4.
  {2 AV/(30 AV/sec)}×30 fps=2 frames
Third Process:
  Calculate a diaphragm value after one frame is formed.
  6 AV−(2 AV/2 frames)=5 AV=F5.6
Fourth Process:
  Calculate a change in brightness after one frame is formed.
  6 AV−5 AV=1 AV
Fifth Process:
  Obtain a new exposure time for compensation of the change in brightness corresponding to 1 AV.
  1/30 sec (=5 TV)→1/60 sec (=6 TV)

As described above, in the case where the diaphragm value for the frame formed before the change is equal to "F8" and the diaphragm value for the frame formed after the change is equal to "F4", firstly calculated are the length of period required for the transition of the diaphragm 307 (that is, the number of frames required for the transition of the diaphragm 307 (2 frames)) (First and Second Processes). The diaphragm value "F5.6" for the frames formed from the start to the end of the change is then interpolated in accordance with the calculated number of frames (2 frames) (Third Process), and imaging conditions are set so as to correspond to the interpolated diaphragm value (Fourth and Fifth Processes). In the above example, since the diaphragm value "F5.6" during the change has a brightness twice as high as that of the diaphragm value "F8", the exposure time is set to "1/60 second" half as long as that before the change so that the brightness is kept constant. Therefore, it is possible to output a moving image having a constant brightness even in a case where the diaphragm is changed.

Then, there are set imaging conditions so as to correspond to the new diaphragm value at a timing of completion of the change of the diaphragm 307 in the interchangeable lens 3 (after 0.06 seconds passes in FIG. 6). For example, upon receiving from the interchangeable lens 3 information on completion of the change of the diaphragm 307, the imaging conditions for the camera body 2 are set so as to correspond to the new diaphragm value "F4". Since the diaphragm value "F4" has a brightness twice as high as that of the diaphragm value "F5.6", the sensitivity is changed from "200" to "100" as exemplified in FIG. 6(c) so that the brightness is kept constant. Therefore, it is possible to output a moving image having a constant brightness even in a case where the diaphragm is changed.

As described above, it is possible to perform imaging under more suited imaging conditions from the start to the end of the change of the diaphragm by calculating the diaphragm value "F5.6 (=AV 5)" for the period for changing from the value "F8" before the change to the value "F4" after the change and setting imaging conditions for the frames formed during the change in accordance with the calculated diaphragm value. Therefore, more smooth AE control is realized on each of image data sequentially generated by the CMOS sensor 201.

3. Summarization

According to the present embodiment, the digital camera 1 is configured as follows. The interchangeable lens 3 includes the diaphragm 307 that regulates an amount of light of the subject image collected by the optical system, the diaphragm driver 308 that drives the diaphragm 307 at a predetermined driving speed, the flash memory 312 that stores diaphragm driving speed information, and a sending unit (the driving speed information sending unit 31, the lens controller 311, and the lens mount 301) that sends the stored diaphragm driving speed information to the camera body 2. The camera body 2 that can be connected with the interchangeable lens 3 includes the CPU 211 that obtains from the interchangeable lens 3 information on a driving speed of the diaphragm 307, the CMOS sensor 201 that captures a subject image using the interchangeable lens 3 to generate image data, and the CPU 211 that sets imaging conditions for the CMOS sensor 201. Along with change of the diaphragm value of the diaphragm 307, the CPU 211 calculates a diaphragm value applicable from the start to the end of the change based on the obtained information on the driving speed of the diaphragm 307 so as to set imaging conditions in accordance with the calculated diaphragm value until completion of the change of the diaphragm 307 in the interchangeable lens 3. It is thus possible to set more suited imaging conditions during the change, and appropriate AE control is realized until completion of the change of the diaphragm. In other words, smooth AE control is enabled on each of sequentially generated image data. In this configuration, it is possible to output a moving image with a brightness thereof being kept constant even in a case where the diaphragm value is changed while the moving image is captured. Further, it is possible to output an image with a brightness thereof being kept constant even in a case of starting taking the image before completion of the change (transition) of the diaphragm, with no need to wait for completion of the change of the diaphragm to start taking a moving image or a still image.

4. Other Embodiments

The present embodiment is not limited to the embodiment described above, but can be embodied in other various embodiments.

For example, the above embodiment refers to the case where diaphragm driving speed information indicates one set value. However, the present embodiment is not limited thereto, but such diaphragm driving speed information may include a plurality of set values. In a case where the driving speed of the diaphragm 307 is changed in accordance with the diaphragm value, the interchangeable lens 3 may hold information on diaphragm driving speeds for each of the diaphragm values so as to send the information to the camera body 2. In this configuration, the camera body 2 is capable of predicting a diaphragm value during change of the diaphragm 307 in accordance with the driving speeds respectively corresponding to the diaphragm values and interpolating the predicted diaphragm value so as to set imaging conditions suitable for the interpolated diaphragm value.

In the present embodiment, when the interchangeable lens 3 is attached to the camera body 2 with the digital camera 1 having been already powered on (S401), the interchangeable lens 3 sends diaphragm driving speed information to the camera body 2 (S402). However, the present configuration does not limit the timing of sending such diaphragm driving speed information as in the present embodiment. Alternatively, when the camera body 2 is switched on with the interchangeable lens 3 having been already connected to the camera body 2, the camera body 2 may send, to the interchangeable lens 3, a signal for requesting diaphragm driving speed information so as to obtain the diaphragm driving speed information from the interchangeable lens 3. In such a case, upon detection of the power supply being switched on, the camera body 2 determines whether the interchangeable lens currently attached thereto is identical to or different from that having been attached when the camera body 2 was previously powered on. The camera body 2 sends a signal for requesting diaphragm driving speed information to the currently attached interchangeable lens 3 upon determination that the interchangeable lens 3 is different from that previously attached. The interchangeable lens 3 sends the diaphragm driving speed information to the camera body 2 in response to the request signal. On the other hand, in a case where the currently attached interchangeable lens is identical to that previously attached, the camera body 2 does not request the interchangeable lens 3 for diaphragm driving speed information upon the current switch-on, as the camera body 2 obtained the diaphragm driving speed information upon previous switch-on. In this manner, the camera body 2 determines whether or not the interchangeable lens 3 currently attached thereto is replaced with that previously attached upon the camera body 2 being switched on, and if necessary, diaphragm driving speed information is sent from the interchangeable lens 3 to the camera body 2. In such a configuration, even in a case where the interchangeable lens is replaced while the camera body 2 is powered off, diaphragm driving speed information can be sent from the interchangeable lens 3 to the camera body 2 upon the power supply being switched on.

In the above embodiment, upon control on the diaphragm 307, the lens controller 311 sends, to the diaphragm driver 308, a diaphragm regulating control signal received from the camera body 2 as well as diaphragm driving speed information stored in the flash memory 312. However, the present embodiment is not limited thereto. Alternatively, the diaphragm driver 308 may store diaphragm driving speed information and may control the drive of the diaphragm 307 in accordance with a control signal received from the lens controller 311 and the stored diaphragm driving speed information. In a case where the interchangeable lens 3 is configured to be capable of controlling the diaphragm 307 only at a constant driving speed, the lens controller 311 does not need to send diaphragm driving speed information to the diaphragm driver 308.

The above embodiment exemplifies the case where information on a brightness of the interchangeable lens 3 is expressed by a diaphragm value (an F number). However, such information on a brightness of the interchangeable lens 3 is not limited to the diaphragm value. Such information on a brightness of the interchangeable lens 3 may be regarding an aperture of the diaphragm 307. Further alternatively, such information on a brightness of the interchangeable lens 3 may be changed along with change of a zoom magnification of the interchangeable lens 3. Such information changed along with change of a zoom magnification of the interchangeable lens 3 is obtained in accordance with a zoom position indicative of a position displaced within a range of movement of the zoom lens 303 as well as an aperture of the diaphragm 307.

While the above embodiment employs the CMOS sensor 201 as a imaging unit, but the imaging unit may have any configuration as long as being capable of capturing a subject image and generating image data (digital signals or electrical signals). Specifically, the camera body 2 according to the above embodiment includes the CMOS sensor 201 that is provided with the light-receiving element, the AGC, and the AD converter. However, the present embodiment is not limited thereto, but the camera body 2 may include a CCD image sensor and an AD converter that are configured by members separated from each other. It should be noted that the imaging unit configured by the CMOS sensor 201 realizes reduction in electric power consumption.

Figure 7:
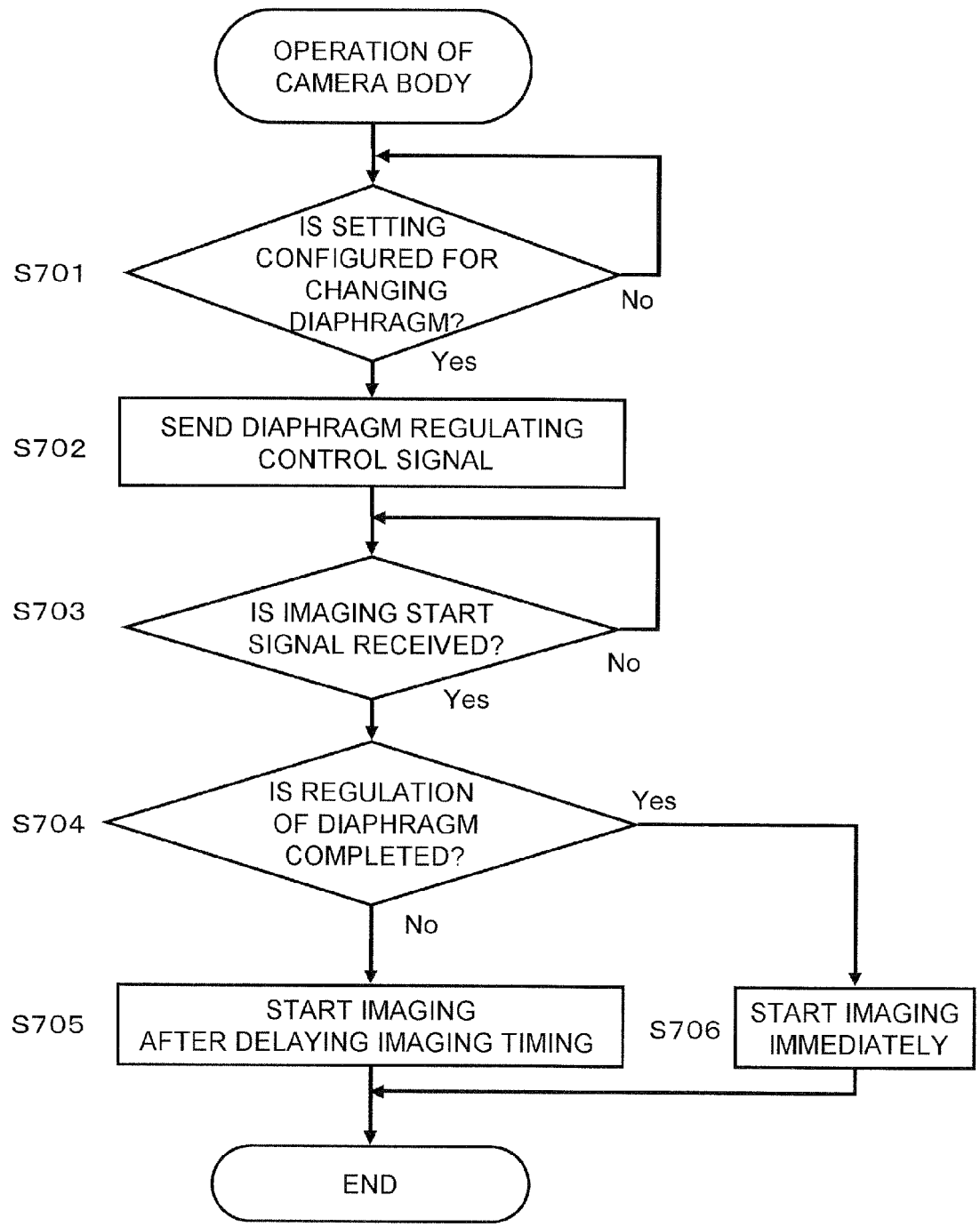
FIG. 7 is a flowchart showing operations, upon imaging, of a digital camera according to another embodiment.
Figure 8:
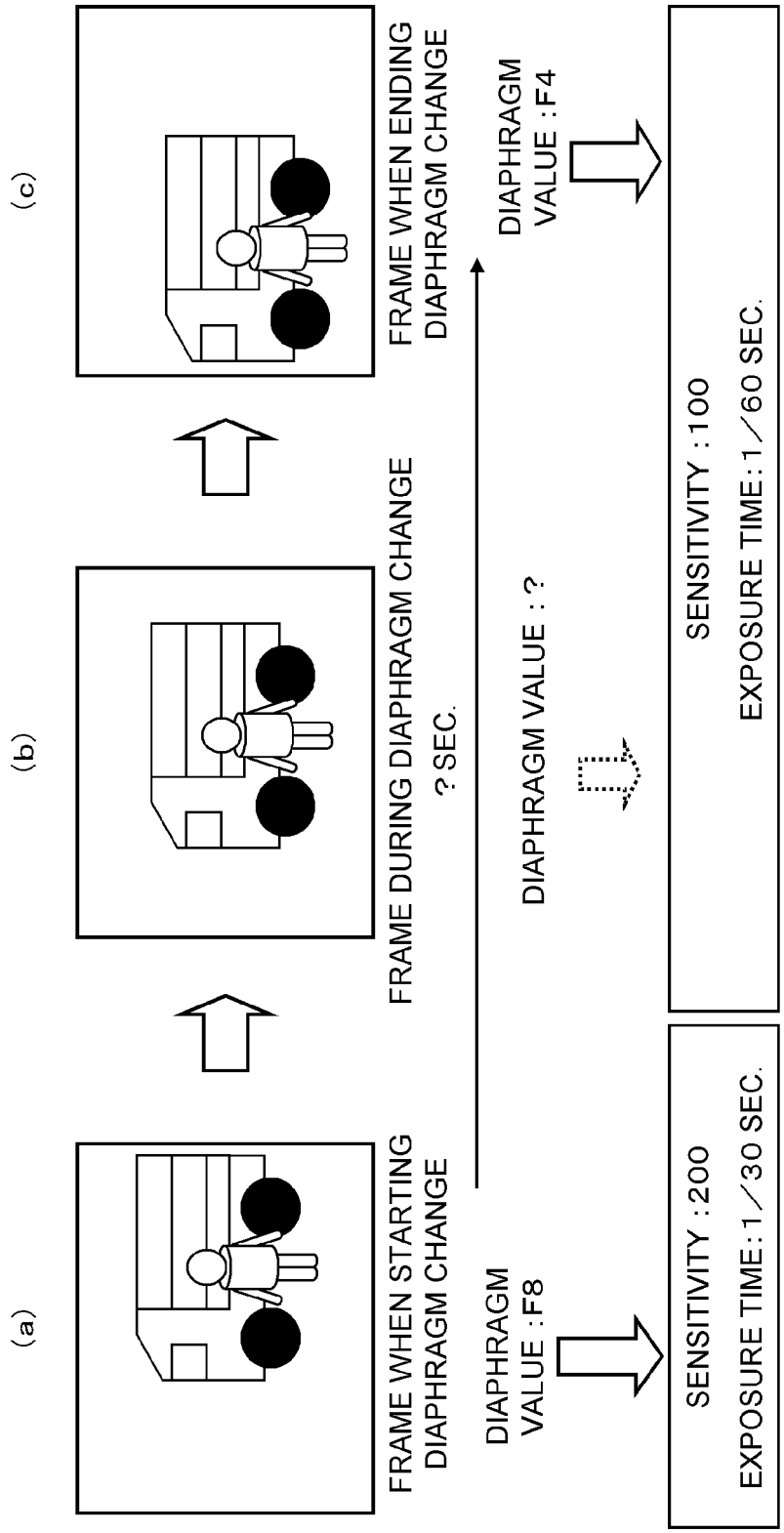
FIG. 8 is a view showing changes in set imaging conditions in a case where a diaphragm value is changed in a conventional camera.

In a case where the interchangeable lens 3 is not provided with a function of sending information indicative of completion of change of the diaphragm to the camera body 2 in response to a diaphragm drive instruction received from the camera body 2, the camera body 2 may be configured to start imaging after completion of the change of the diaphragm as described below. In this configuration, the CPU 211 in the camera body 2 controls an imaging timing for the CMOS sensor 201 in accordance with an imaging start signal for instructing the camera body 2 to start imaging. The CPU 211 controls the imaging timing for the CMOS sensor 201 in accordance with a diaphragm value of the diaphragm 307 changed upon imaging as well as with diaphragm driving speed information stored in the flash memory 209. FIG. 7 is a flowchart showing operations of the CPU 211 in this case.

With reference to FIG. 7, the CPU 211 in the camera body 2 determines whether or not the camera body 2 is set to change the diaphragm (S701). In a case where it is set to change the diaphragm, the CPU 211 sends a diaphragm regulating control signal to the interchangeable lens 3 in accordance with the setting (S702). Thereafter, the CPU 211 determines whether or not the CPU 211 has received an imaging start signal (S703). Upon receiving the imaging start signal (Yes in S703), the CPU 211 determines whether or not regulation of the diaphragm 307 in the interchangeable lens 3 is completed in accordance with the diaphragm driving speed information stored in the flash memory 209 as well as with the diaphragm regulating control signal (S704). Upon determination that the diaphragm is being changed (No in S704), the camera body 2 delays an imaging timing for the CMOS sensor 201 and then starts imaging (S705). The camera body 2 preferably delays the imaging timing so as to be matched with a frame assumed to correspond to completion of the regulation of the diaphragm 307. Thus, it is prevented to start imaging before the diaphragm 307 is changed to have a desired diaphragm value.

On the other hand, in a case where the diaphragm is determined to have completed changing (Yes in S704), the CMOS sensor 201 immediately starts imaging (S706). When the imaging is started, the signal processing processor 203 performs image treatments onto image data generated by the CMOS sensor 201. The CPU 211 then stores the processed image data in a memory medium such as the memory card 218 or the like, and completes the imaging operation.

As described above, the camera body 2 can be connected with the interchangeable lens 3 that is capable of sending diaphragm driving speed information. The camera body 2 includes the CPU 211 that obtains from the interchangeable lens 3 the diaphragm driving speed information, the CMOS sensor 201 that captures a subject image formed using the interchangeable lens 3 and generates image data, and the CPU 211 that controls an imaging timing for the CMOS sensor 201 in accordance with an imaging start signal for instructing the camera body 2 to start imaging. Further, the CPU 211 controls the imaging timing for the CMOS sensor 201 in accordance with a diaphragm value of the diaphragm 307 changed upon imaging as well as with the obtained diaphragm driving speed information. This configuration prevents the camera body from starting imaging upon receipt of the imaging start signal before the diaphragm is changed to have a desired diaphragm value. Therefore, even in a case where the interchangeable lens 3 is not provided with a function of informing completion of change of the diaphragm, the camera body 2 is capable of starting imaging after the desired diaphragm value is set.

In the present embodiment, the AE control is performed so that the brightness of the moving images is constant. However, the configuration is not limited thereto. The camera body may perform the AE control so that the brightness of the moving image is in the predetermined or arbitrary range. Further, the camera body may perform the AE control so that the brightness of the moving image is at an arbitrary value.

In the present embodiment, the camera body calculates the diaphragm value of the frame before completing the diaphragm regulation based on the drive speed of the diaphragm, and can regulate the brightness of the image data generated by the CMOS sensor before completing the diaphragm regulation based on the calculated diaphragm value. However, the configuration is not limited to the present embodiment. The camera body may regulate the brightness of the image data generated by the CMOS sensor based on the drive speed of the diaphragm without calculating the diaphragm value of the frame before completing the diaphragm regulation.

The above case is realized in the following method. For example, the camera body performs the following processes A-C in the case where the camera body sends a control signal for changing the diaphragm to the interchangeable lens (the diaphragm values [F8]→[F4]). The conditions prior to the change are assumed as indicated below.

[Conditions Prior to Change]
   diaphragm value: F8 (=6 AV)
   sensitivity: 200
   exposure time: 1/30 (=5 TV)
   diaphragm speed: 30 AV/sec
   frame rate: 30 fps

[Processes]
Process A:
   Calculate a diaphragm transition amount.
   6 AV−4 AV=2 AV
Process B:
   Calculate the number of frames included in the period of diaphragm transition from F8 to F4.
   {2 AV/(30 AV/sec)}×30 fps=2 frames
Process C:

Calculate an amount of change in the brightness of the interchangeable lens (the diaphragm value) per one frame, based on the number of frames calculated at the process B.

2 AV/2 flames=1 AV

Process D:

Obtain a new exposure time for compensation of the change in brightness corresponding to 1 AV.

1/30 sec (=5 TV)−1/60 sec (=6 TV)

As described above, in the case where the diaphragm value for the frame before the change is equal to "F8" and the diaphragm value for the frame after the change is equal to "F4", firstly calculated are the length of period required for the transition of the diaphragm 307 (that is, the number of frames required for the transition of the diaphragm 307 (2 frames)) (Processes A and B). Next, the camera body calculates an amount of change in the brightness (1 AV) of the interchangeable lens per one frame based on the calculated number of frames (2 frames) (Process C). The camera body obtains a new exposure time for compensation of the change in brightness corresponding to 1 AV after one frame based on the calculated amount of change of brightness (Process D).

In this way, the camera body can perform smooth AE control on each of image data sequentially generated when the diaphragm value of the interchangeable lens is changed.

The present embodiment refers to the case where the imaging apparatus is embodied as a digital still camera. However, the present embodiment is not limited thereto, but is applicable to a digital video camera.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application No. 2008-132766, filed on May 21, 2008 which is expressly incorporated herein by reference in its entirety.

INDUSTRIAL APPLICABILITY

The present embodiment exerts an effect that smooth AE control is performed on each of sequentially generated image data even upon change of information on a brightness of an interchangeable lens, and is useful in a digital still camera as well as in a digital video camera.

What is claimed is:

1. A camera body to which an interchangeable lens is mountable, the interchangeable lens including a diaphragm and capable of sending driving speed information of the diaphragm, wherein the camera body comprises:
   a receiving unit operable to receive the driving speed information of the diaphragm from the interchangeable lens;
   an imaging unit operable to capture a subject image formed by the interchangeable lens at a predetermined frames-per-second rate to generate image data;
   a controller operable to set an imaging condition for the imaging unit; and
   a sending unit operable to send a control signal to the interchangeable lens for changing brightness information of the interchangeable lens, and
the controller calculates a number of frames which the imaging unit captures from a start to an end of a driving of the diaphragm according to the received driving speed information so as to set the imaging condition for each one of the frames when the sending unit sends the control signal to the interchangeable lens.

2. The camera body according to claim 1, wherein the controller calculates a diaphragm value of the interchangeable lens for each one of the frames, and sets the imaging condition for each one of the frames based on the calculated diaphragm value.

3. The camera body according to claim 1, wherein the imaging condition includes at least one of a sensitivity and an exposure time for the imaging unit.

4. The camera body according to claim 1, wherein the brightness information of the interchangeable lens is a diaphragm value of the diaphragm of the interchangeable lens.

5. An imaging apparatus comprising an interchangeable lens and a camera body to which the interchangeable lens is mountable, the interchangeable lens comprising:
   a diaphragm operable to regulate an amount of light of a subject image collected by an optical system;
   a driver unit operable to drive the diaphragm at a predetermined driving speed;
   a storage unit operable to store driving speed information of the diaphragm; and
   a sending unit operable to send the stored driving speed information of the diaphragm to the camera body, and
the camera body comprising:
   a receiving unit operable to receive the driving speed information of the diaphragm from the interchangeable lens;
   an imaging unit operable to capture the subject image formed by the interchangeable lens at a predetermined frames-per-second rate to generate image data;
   a controller operable to set an imaging condition for the imaging unit; and
   a sending unit operable to send a control signal to the interchangeable lens for changing brightness information of the interchangeable lens, wherein
the controller calculates a number of frames which the imaging unit captures from a start to an end of a driving of the diaphragm according to the received driving speed information so as to set the imaging condition for each one of the frames when the sending unit sends the control signal to the interchangeable lens.

* * * * *